US010095245B2

(12) United States Patent
Nutt et al.

(10) Patent No.: US 10,095,245 B2
(45) Date of Patent: Oct. 9, 2018

(54) FLOW OPTIMISER

(71) Applicant: REVOLUTER LIMITED, Repton, Derby Derbyshire (GB)

(72) Inventors: Daniel Nutt, Burton upon Stather (GB); Eric Bannister, Repton (GB)

(73) Assignee: Revoluter Limited, Derbyshire (GB)

( * ) Notice: Subject to any disclaimer, the term of this patent is extended or adjusted under 35 U.S.C. 154(b) by 461 days.

(21) Appl. No.: 14/443,730

(22) PCT Filed: Nov. 19, 2012

(86) PCT No.: PCT/GB2012/052862
§ 371 (c)(1),
(2) Date: May 19, 2015

(87) PCT Pub. No.: WO2014/076443
PCT Pub. Date: May 22, 2014

(65) Prior Publication Data
US 2016/0062366 A1 Mar. 3, 2016

(51) Int. Cl.
G05D 7/00 (2006.01)
E04D 1/30 (2006.01)
G05D 7/06 (2006.01)
F03D 9/34 (2016.01)
F03D 80/00 (2016.01)
F03D 3/04 (2006.01)
(Continued)

(52) U.S. Cl.
CPC ............ G05D 7/0629 (2013.01); E04B 7/18 (2013.01); F03D 3/04 (2013.01); F03D 3/0472 (2013.01); F03D 9/34 (2016.05); F03D 13/20 (2016.05); F03D 80/00 (2016.05); G05B 13/021 (2013.01); F05B 2240/12 (2013.01); F05B 2240/9112 (2013.01); Y02B 10/30 (2013.01); Y02E 10/728 (2013.01); Y02E 10/74 (2013.01)

(58) Field of Classification Search
CPC ..... E04H 9/14; E04H 9/16; E04B 7/18; F03D 3/04; Y02E 10/74
USPC ........................................................ 700/282
See application file for complete search history.

(56) References Cited

U.S. PATENT DOCUMENTS 4,726,618 A * 2/1988 Hansen .................. B60J 1/2008
296/91
6,149,517 A * 11/2000 Hansen ................. E04D 13/174
454/365
(Continued)

FOREIGN PATENT DOCUMENTS

CA 2582176 A1 9/2008
DE 102009010087 A1 8/2010
(Continued)

Primary Examiner — Michael J Brown
(74) Attorney, Agent, or Firm — Schwartz Law Firm, P.C.

(57) ABSTRACT

A roof 201 has an apex 200. A wind turbine 202 is positioned above the apex 200. Air flows through the gap 204 between the apex 200 and the turbine 202. A flow optimizer 203 diverts a section of airflow close to the apex 200 into the region 205, downstream of the apex. This section of diverted airflow is turned away from the local airflow direction towards the surface of the roof 201, downstream of the apex. This reduces the boundary layer separation and turbulence downstream of the apex 200, which reduces energy loss associated with sub-optimal static pressure recovery downstream of the apex 200, and thus increases the discharge coefficient of the system.

18 Claims, 13 Drawing Sheets

(51) Int. Cl.
  *E04B 7/18*     (2006.01)
  *G05B 13/02*    (2006.01)
  *F03D 13/20*    (2016.01)

(56) References Cited

U.S. PATENT DOCUMENTS

| | | | |
|---|---|---|---|
| 8,257,020 B2 * | 9/2012 | Graham, Sr. | F03D 3/002 |
| | | | 415/4.3 |
| 2010/0126086 A1 * | 5/2010 | Paggi | F03D 3/002 |
| | | | 52/173.1 |
| 2011/0304153 A1 * | 12/2011 | Schum | F03D 1/025 |
| | | | 290/55 |
| 2013/0049373 A1 * | 2/2013 | Lee | F24F 7/02 |
| | | | 290/55 |

FOREIGN PATENT DOCUMENTS

| | | |
|---|---|---|
| GB | 2474333 A | 4/2011 |
| WO | WO2006/123951 A1 | 11/2006 |

* cited by examiner

FLOW OPTIMISER

The invention relates to a device for increasing the acceleration of airflow over the apex of a roof, the increased air velocity being used to increase the output of a wind turbine collocated with the device.

Present roof mounted turbines such as described in GB2187512, WO2010106337 and GB2476830 of axial, horizontal transverse and vertical axis flow design are intended to benefit from the acceleration of airflow provided by the pitched roof upon which they are installed, the turbine extracting energy from the airflow with a higher velocity than the free stream. The prior art designs however suffer from a lack of efficiency as a result of suboptimal design and installation, principally due to the airflow detaching from the roof surface downstream of the roof apex, limiting the acceleration achieved over the apex. In other words airflow which passes over the roof apex does not diffuse over the downstream side of the roof to the maximum extent possible, resulting in a reduction in flow acceleration over the apex than may otherwise be achieved. Separation over the downstream side of the roof results in turbulence and permanent energy loss from the system. In other words prior art designs suffer from a low proportion of energy recovery downstream of the roof apex due to turbulence, and consequently a low discharge coefficient over the roof. The net result is a path of greater resistance to the flow over the apex and a blocking effect in the gap between the roof apex and any turbine installed over the apex. Since the upper boundary of the system is the atmosphere, the air flowing through the system with a greater blocking effect will tend to follow the path of least resistance over the top of the turbine assembly and not be utilised by the energy extracting region of the turbine.

Maximum airflow velocity is critical to the operating efficiency of the aforementioned prior art turbines. Their inlet area is typically smaller than conventional open rotor turbines. To counter this, power output per unit area is increased due to the higher velocity of airflow over the roof apex, the power output of the turbine varying with the cube of the wind velocity, which allows moderate increase in airflow velocity to have a large effect on the turbine output. In many ways, the optimisation of design and installation to increase airflow acceleration is analogous to problems arising in venturi design, although this problem is presented as a single-sided venturi, the other side being open to atmosphere.

In relation to roof mounted wind turbines, it is known that flow diversion or flow concentrating devices may be added to improve turbine efficiency. Flow diversion or flow concentrating devices known in the prior art function to divert or direct airflow through the turbine, such as can be seen in CA2739538 and WO2011010159. Often, problems associated with prior art designs originate from the flow diverter or flow concentrator creating too much resistance to the flow; this can also be referred to as a blocking effect. The resulting flow through the diverter or concentrator and thus the turbine is less than that which could be achieved, since the flow bypasses the device and flows freely around the outside in the open atmosphere. Furthermore, the prior art designs do not aid static pressure recovery downstream of the apex, which if considered, would aid the acceleration of the flow over the apex.

The invention described herein serves to improve the efficiency of a transverse or cross flow wind turbine mounted in the region of accelerated flow around the apex of a roof. The invention diverts a portion of air which does not pass through the turbine but does pass through the gap between the apex of the roof and the turbine, into the region downstream of the roof apex. The function of the device is to improve the acceleration of the airflow and hence increase the mass flow rate in the gap between the apex and the turbine. The existence of the gap is essential to allow the airflow to accelerate over the roof without blockage. The turbine is positioned above the gap, the turbine blades extracting energy from the accelerated airflow. The device may be applied to conventional pitched roofs with a ridge line apex or curved roofs with a curved apex.

According to a first aspect of the invention there is provided an airflow guide hereafter referred to as a Flow Optimiser. The Flow Optimiser comprises one or more separate curved sections, which are configured to be positioned in a gap between an apex of a roof and a wind turbine. The Flow Optimiser is arranged to be positioned substantially parallel to the apex of the roof such that, in use, the flow optimiser is positioned in an airflow. The one or more curved sections are shaped so as to divert airflow accelerated by the apex of the roof into the direction of the roof surface downstream of the apex, to increase the mass flow rate in the gap between the apex and the wind turbine. The Flow Optimiser is also arranged to be collocated with the wind turbine positioned substantially above the Flow Optimiser.

The Flow Optimiser increases the acceleration of airflow by reducing energy loss associated with accelerating airflow over a roof.

In an exemplary embodiment the Flow Optimiser would be collocated with a transverse flow roof mounted turbine such as the applicant's previous invention described in WO2010106337. In such an embodiment the gap between the apex of the roof and the transverse turbine would be configured to allow a portion of the air flowing through the gap to pass through the Flow Optimiser.

The Flow Optimiser diverts a section of airflow close to the apex of the roof into the region downstream of the apex. This section of diverted airflow is turned away from the local flow direction towards the roof surface downstream of the apex. The section of diverted airflow encourages adjacent flow to change direction in the same sense through entrainment. The result is to reduce the boundary layer separation and turbulence downstream of the apex and to increase expansion of flow streamlines or flow diffusion as the flow moves downstream of the apex. The Flow Optimiser injects higher energy airflow into the region of flow separation, vorticity and flow recirculation. The Flow Optimiser reduces permanent energy loss associated with sub-optimal static pressure recovery downstream of the apex of a roof and thus increases the discharge coefficient of the system. As the discharge coefficient increases, the flow expansion or flow diffusion improves and the resistance experienced by the airflow through the gap between the apex of the roof and the wind turbine reduces, as a consequences the mass flow rate through the gap will increase and turbine power output will increase with the cube of the airflow velocity.

In the case of multiple curved sections forming the Flow Optimiser, the multiple curved sections are spaced apart by a certain distance moving away from the apex and align substantially perpendicular to the direction of airflow, each section has the same profile and length as the one or more other sections.

Alternatively in the case of multiple curved sections forming the Flow Optimiser, the multiple curved sections are spaced apart by a certain distance moving away from the apex and align substantially perpendicular to the direction of airflow, each section has a different profile and different length to the one or more other sections. The advantage of a multiple section Flow Optimiser is that more flow may be diverted more accurately and by varying amounts than may be achieved with a single section albeit with an increase in form drag.

In an alternative configuration the Flow Optimiser comprises more than one curved section, each section intended to direct the diverted airflow away from the local flow direction towards the roof surface downstream of the apex and one or more of the curved sections are rotated relative to one or more other curved sections about an axis substantially parallel to the apex of the roof with which the Flow Optimiser is collocated. Multiple curved sections may be arranged to diffuse the airflow evenly into the area downstream of the Flow Optimiser and the apex of the roof, this arrangement may also allow an optimal pressure distribution to be established around one or more of the curved sections.

An alternative embodiment features a Flow Optimiser comprising multiple curved sections, with one or more of the curved sections located substantially upstream of one or more of the other sections. The function of the one or more upstream sections is to precondition airflow upstream of the one or more other sections. Airflow preconditioning may take the form of controlling the angle of the airflow, the velocity of the airflow or both the angle and velocity of the airflow. In other arrangements the one or more curved sections may be used to regenerate airflow over a low pressure surface on one or more of the other curved sections.

A further embodiment features Flow Optimiser where one or more of the curved sections include any combination of slots, apertures or secondary inlets or outlets which function to vary the airflow rate on either side of the curved section as the airflow moves along the chord line of the section. Airflow slots may be positioned on one or more of the sections, the airflow slots may be arranged to bleed air into the Flow Optimiser that would otherwise pass through the gap between the Flow Optimiser and the turbine thereby increasing the airflow through the Flow Optimiser. In other arrangements apertures may be used in place of slots and the slots or apertures may function to bleed air from the diverted flow within the Flow Optimiser into the gap between the Flow Optimiser and the turbine. It is envisaged that one or more slots or apertures may be located on one or more of the curved sections which make up the Flow Optimiser. Slots or apertures may be arranged to bleed airflow from either side of the surface to suit the particular configuration of Flow Optimiser installed.

According to a second aspect of the invention there is provided a method of controlling the position and angle of a Flow Optimiser as described above, the method comprising the steps of: adjusting the position and angle of one or more of the curved sections of the Flow Optimiser; determining the electrical output of the collocated wind turbine; and repeating the above steps in order to achieve required electrical power output from an electrical generator.

According to a third aspect of the invention there is provided a method of controlling a Flow Optimiser as described above, the method comprising the steps of: receiving an input from one or more of a plurality of sensors; comparing the received input to a predetermined value; and using the results from the comparison step to determine the required adjustment to the position and angle of each curved section of the Flow Optimiser.

The input which is received from the one or more sensors may be compared to either a preset value or a previously measured value from one or more of the sensors, or a value determined from a look-up table.

Alternatively, the input received from the one or more sensors may be compared to an other predetermined value.

Optionally, the variable is selected from the group comprising: airflow speed; airflow direction; temperature; humidity; vibration; and pressure.

In an alternative embodiment the actuation of the one or more curved sections may be achieved aerodynamically. Alternatively the actuation of one or more curved sections may be linked to the operation of the turbine or turbine accessories to which the Flow Optimiser is collocated. The actuation of the one or more curved sections may be in response to outputs from a control algorithm such as found in a computerised control system.

A person skilled in the art could envisage a number of methods to achieve the desired movement of the curved sections of the Flow Optimiser, these methods include but are not limited to translation and rotation with jacks or, rotation about an axis, rotation and translation about a variable track. Curved sections may be translated or rotated by an infinitely variable amount or in preset steps.

The Flow Optimiser may be controlled to configure the one or more curved sections to direct airflow from either side of the roof.

The Flow Optimiser may be controlled to configure the one or more curved sections to optimise acceleration of the airflow within the gap above the Flow Optimiser, this control may be in response to but not limited to airflow velocity measurement, pressure measurement, airflow angle measurement or mechanical movement in response to forces within the airflow.

The Flow Optimiser may be controlled to configure the one or more curved sections to optimise the diffusion or expansion of the airflow downstream of the apex, in order to reduce the energy loss in the system, this control may be in response to but not limited to airflow velocity measurement, pressure measurement, airflow angle measurement or mechanical movement in response to forces within the airflow.

There now follows a description of preferred embodiments of the invention. Although descriptions and figures are presented for a pitched roof and transverse flow wind turbine, they are equally applicable to transverse flow wind turbines collocated with other roof types including curved roofs. The following description is by way of non-limiting example, with reference being made to accompanying drawings in which:

FIG. 2A illustrates a first exemplary flow regime downstream of the apex.

FIG. 2B illustrates a second flow regime downstream of the apex.

FIG. 2C illustrates a third flow regime downstream of the apex.

Figure 1:
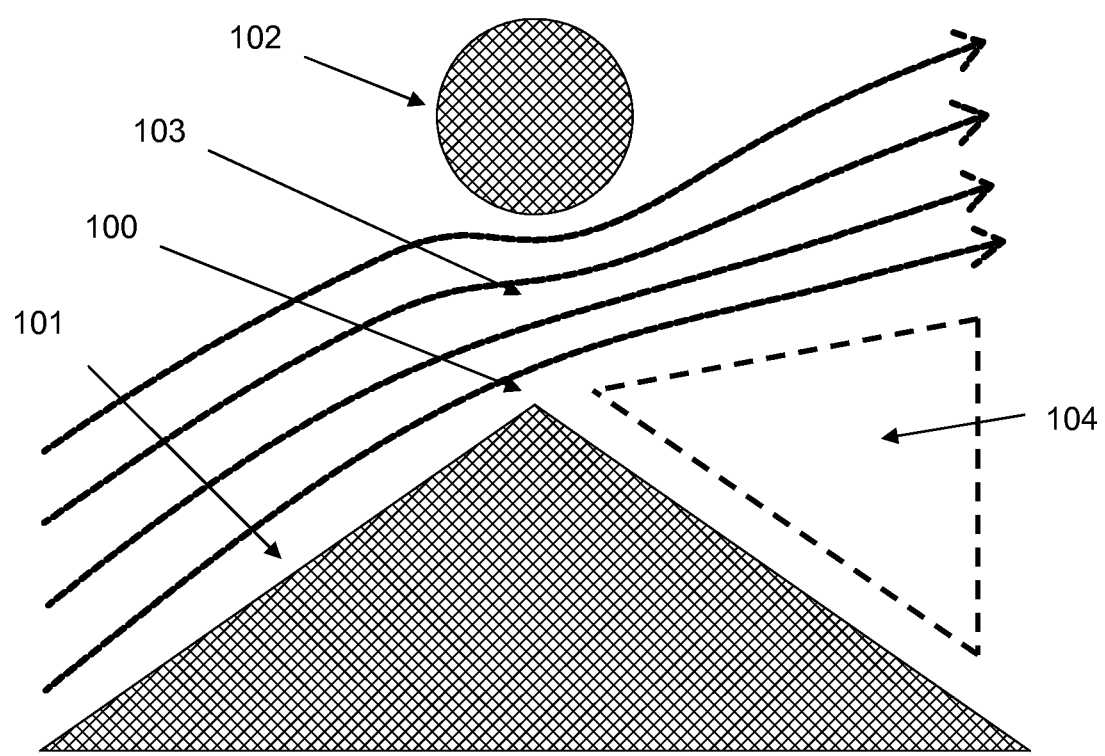
FIG. 1 is a cross sectional view of a pitched roof and a transverse flow turbine located above the apex of the roof representing designs in the prior art.

Referring to FIG. 1, the prior art such as described in the applicant's previous invention WO2010106337 is represented by a cross sectional view of a pitched roof 101, a transverse flow turbine 102 located above the apex 100 of the roof 101, a gap 103 is formed between the turbine 102 and the apex of the roof 100. The airflow streamlines narrow and the airflow velocity increases as the airflow rises over the pitched roof 101, the streamlines can be seen narrowing further in the gap 103 between the turbine 102 and the apex 100 of the roof 101. For simplicity, the turbine 102 in FIG. 1 is shown as a solid disk, the actual turbine comprises multiple blades which extract energy from the accelerated airflow. The limitation of the prior art design is that streamline expansion in the low pressure region downstream of the apex 100 of the roof is not maximised. The airflow separates from the downstream side of the roof forming an area of flow separation 104, turbulence and permanent energy loss from the system as an adverse pressure gradient is established. Energy is lost from the system when the static pressure fails to fully recover downstream of the apex 100 resulting in a low system discharge coefficient. The lower the discharge coefficient the greater the resistance experienced by the air flowing through the gap.

Figure 2A:
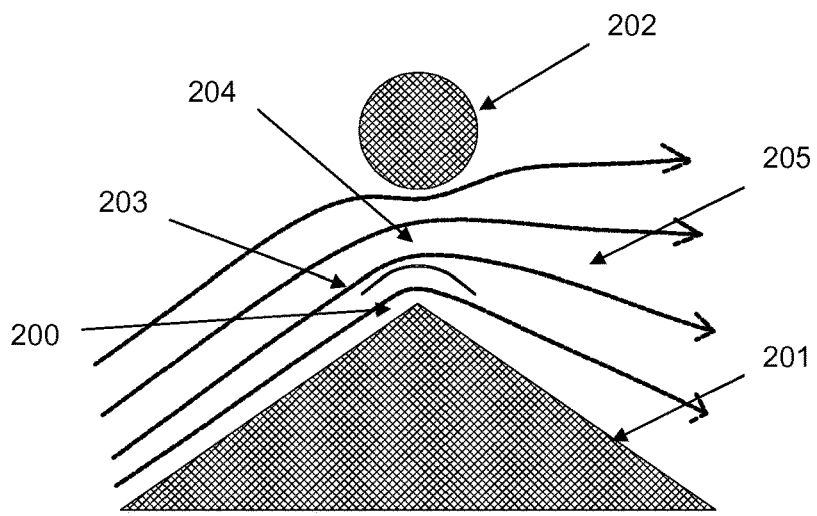
FIG. 2A is a cross sectional view according to the first embodiment of the invention comprising a pitched roof and a transverse flow turbine located above the apex of the roof, a Flow Optimiser is located in the gap between the apex of the roof and the turbine.
Figure 2B:
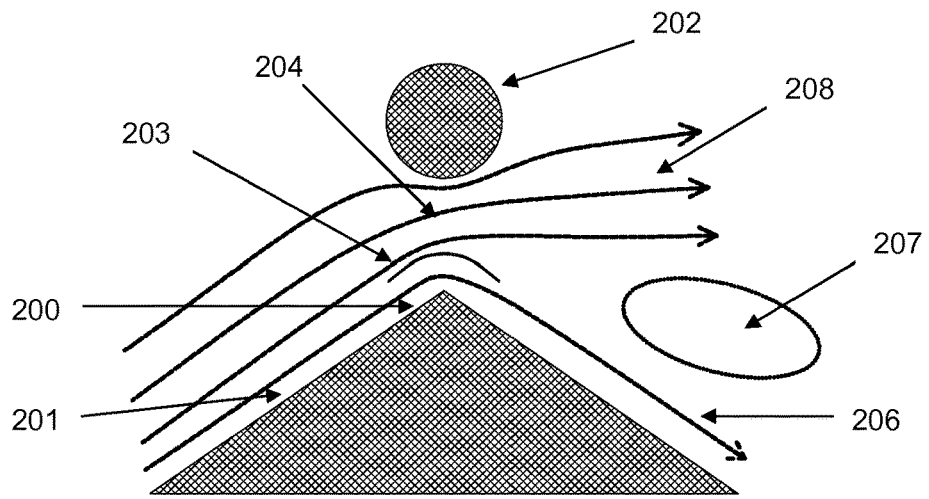
FIG. 2B is a cross sectional view according to the first embodiment of the invention comprising a pitched roof and a transverse flow turbine located above the apex of the roof, a Flow Optimiser is located in the gap between the apex of the roof and the turbine.
Figure 2C:
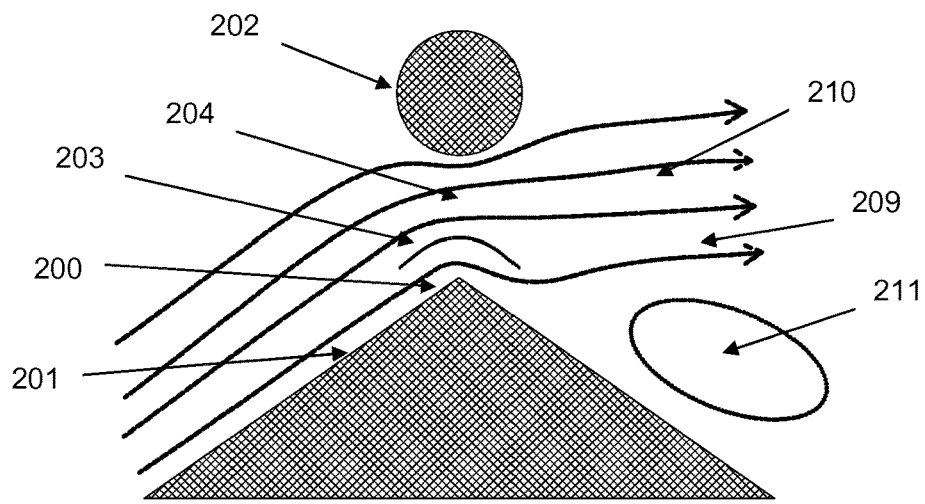
FIG. 2C is a cross sectional view according to the first embodiment of the invention comprising a pitched roof and a transverse flow turbine located above the apex of the roof, a Flow Optimiser is located in the gap between the apex of the roof and the turbine.
Figure 3:
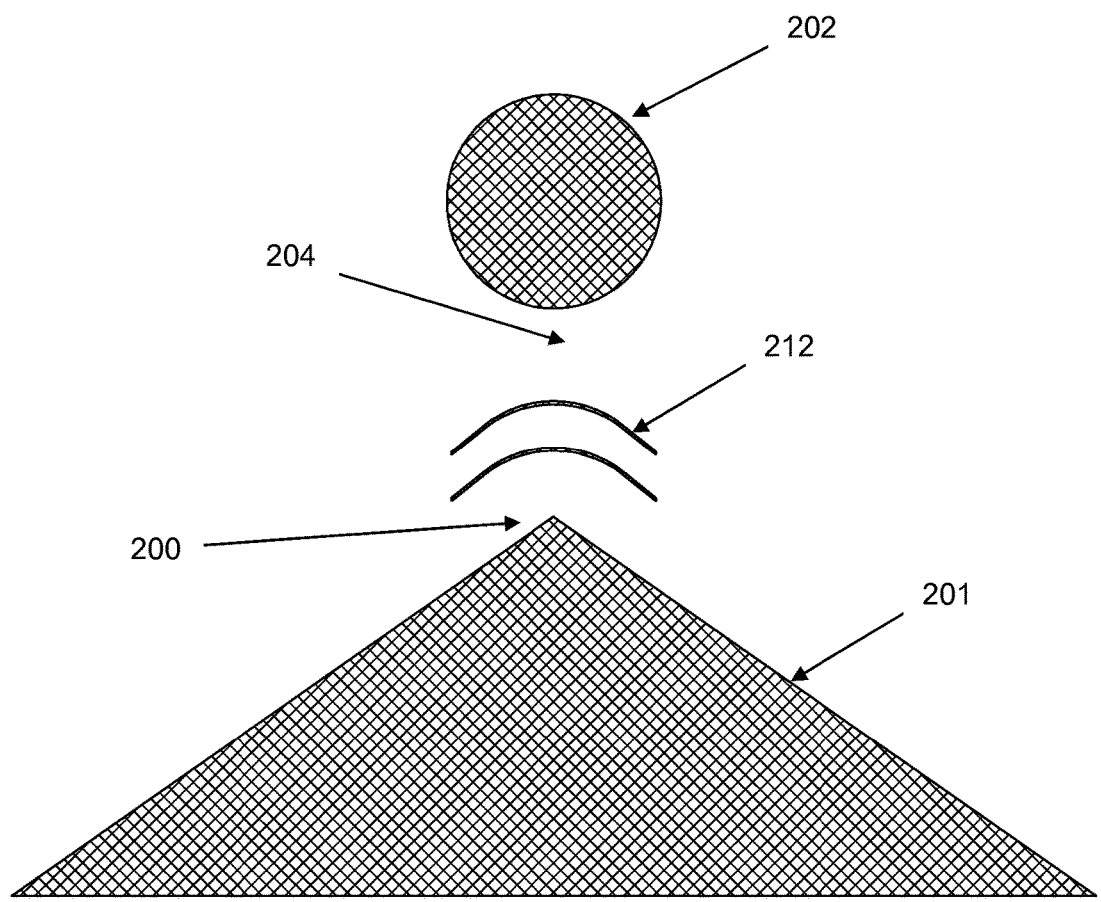
FIG. 3 is a cross sectional view of the pitched roof, transverse flow turbine and Flow Optimiser assembly according to the first embodiment of the invention, in this example the Flow Optimiser is shown as comprising of two curved sections one located above the other.
Figure 4:
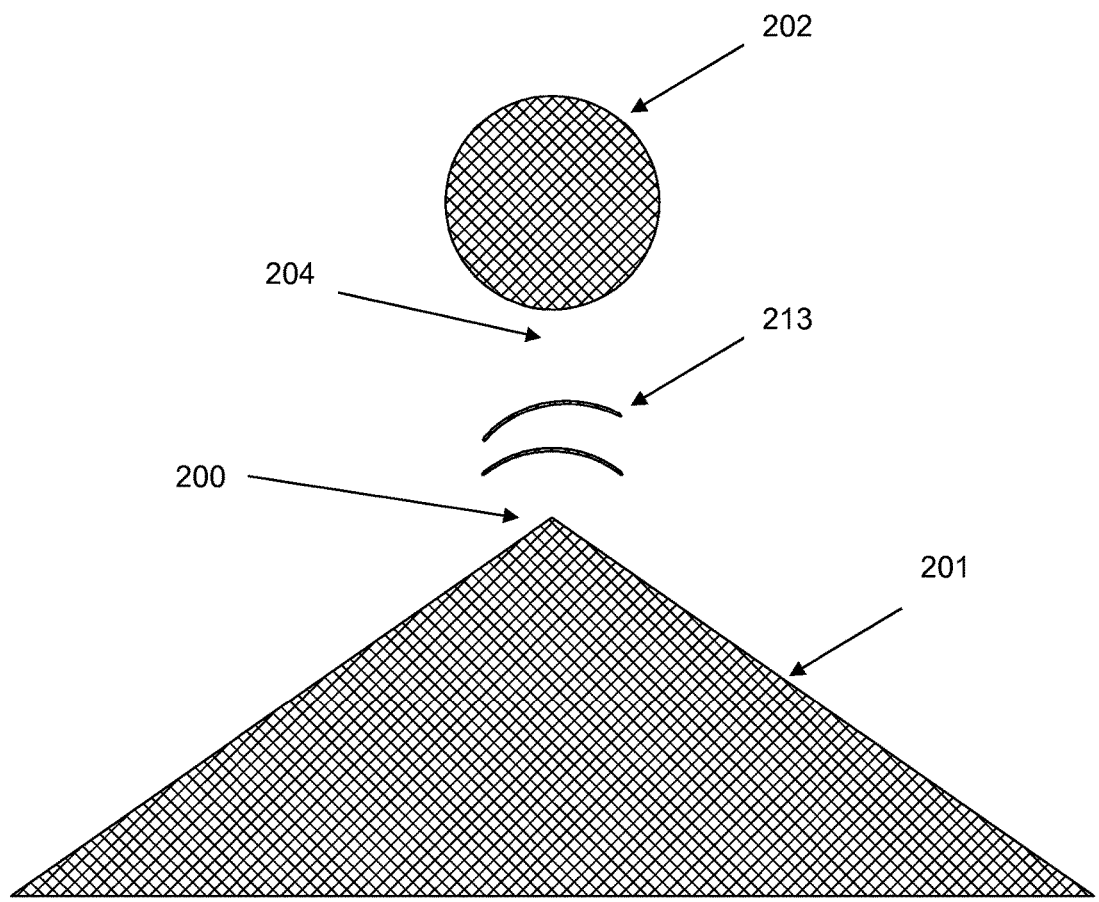
FIG. 4 is a cross sectional view of the pitched roof, transverse flow turbine and Flow Optimiser assembly according to the first embodiment of the invention, in this example the Flow Optimiser is shown as comprising of two curved sections one rotated relative to the other.

Referring to FIGS. 2 to 4, a Flow Optimiser according to a first embodiment of the invention is designated by the numerals 203, 212, 213. FIG. 2A, a Flow Optimiser 203 according to a first embodiment of the invention, is positioned above the apex 200 of the roof 201 in the gap 204 between the apex 200 of the roof 201 and the turbine 202. The Flow Optimiser 203 Optimiser diverts a section of airflow close to the apex 200 of the roof 201 into the region downstream 205 of the apex. This section of diverted airflow is turned away from the local airflow direction towards the surface downstream of the apex. The section of diverted airflow encourages adjacent airflow to change direction in the same sense through entrainment. The result is to reduce the boundary layer separation and turbulence downstream 205 of the apex of the surface and to increase expansion of airflow streamlines or airflow diffusion as the flow moves downstream of the apex 200 of the roof 201. The Flow Optimiser 203 injects higher energy airflow into the region of flow separation, vorticity and flow recirculation. The Flow Optimiser 203 reduces permanent energy loss associated with the sub-optimal static pressure recovery downstream of the apex 200 of the roof 201 and thus increases the discharge coefficient of the system. As the discharge coefficient increases, the airflow expansion or airflow diffusion improves and the resistance experienced by the air flowing through the gap 204 between the apex 200 of the roof 201 and the turbine 202 reduces, as a consequences the mass flow rate through the gap 204 will increase and turbine power output will increase with the cube of the fluid velocity. Airflow streamlines in FIG. 2A illustrate the ideal case of expansion of the airflow 205 over the downwind side of the roof 201 with little airflow separation or turbulence and a discharge coefficient approaching unity. In this embodiment the Flow Optimiser 203 consists of a single curved surface positioned substantially centrally over the apex 200 of the roof 201, the surface is also substantially symmetrical about its central position perpendicular to the direction of flow. In other embodiments, the surface may be asymmetric about its central position in the plane perpendicular to the direction of flow.

FIG. 2B illustrates a second flow regime achieved by the Flow Optimiser 203, a section of airflow close to the apex 200 of the roof 201 is diverted into the region downstream of the apex. This section of diverted airflow 206 is turned away from the local airflow direction towards the surface downstream of the apex. The section of diverted airflow encourages adjacent airflow 208 to change direction in the same sense through entrainment. Due to suboptimal conditions which may include excessive flow diversion angle away from the local free stream direction, a region of flow recirculation and turbulence 207 forms between the diverted flow 206 and the expanding flow 208 downstream of the gap 204. The existence of the region of flow recirculation 207 will result in permanent energy loss from the system and a discharge coefficient less than seen in the regime illustrated in FIG. 2A, this is thus a less desirable flow regime but may represent the best case for a certain combination of parameters.

FIG. 2C illustrates a third flow regime achieve by the Flow Optimiser 203, a section of airflow close to the apex 200 of the roof 201 is diverted into the region downstream of the apex. This section of diverted airflow 209 is turned away from the local airflow direction towards the surface downstream of the apex. The section of diverted airflow encourages adjacent airflow 210 to change direction in the same sense through entrainment. Due to suboptimal conditions which may include excessive flow diversion angle away from the local free stream direction or reduced Flow Optimiser effectiveness, a region of flow recirculation and turbulence 211 forms between the roof surface downstream of the apex and the diverted flow 209. The existence of the region of flow recirculation 211 will result in permanent energy loss from the system and a discharge coefficient less than seen in the regime illustrated in FIG. 2A, this is thus a less desirable flow regime but may represent the best case for a certain combination of parameters.

It is envisaged that the three flow regimes illustrated in FIGS. 2A,B,C may be used singularly or in any combination to improve the mass flow rate passing through the gap 204 and hence increase the energy available for extraction by the wind turbine 202.

FIGS. 2 to 7 illustrate the Flow Optimiser device 203, 212, 213, 303, 305, 403, 503, collocated with a transverse flow wind turbine installed over a conventional pitched roof. The Flow Optimiser device may be installed over a wide variety of roof designs and sizes including domestic, commercial, warehouse storage and may include curved or cylindrical roofs. For simplicity, the turbine 202, 302, 402, 502 is shown as a solid disk, the actual turbine comprises multiple blades which extract energy from the accelerated airflow.

Referring to FIG. 3, a Flow Optimiser 212 according to the first embodiment of the invention, is positioned above the apex 200 of the roof 201 in the gap 204 between the apex 200 and the turbine 202. In this arrangement the Flow Optimiser 212 consists of two curved sections, one positioned above the other, both surfaces are the same shape and size and function to divert a larger portion of airflow more accurately than would be possible with a single surface Flow Optimiser 203 as illustrated in FIG. 2A,B,C. The greater portion of airflow through the Flow Optimiser further reduces permanent energy loss associated with the sub-optimal static pressure recovery downstream of the apex 200 of the roof 201 and thus increases the discharge coefficient of the system. In other embodiments more than two curved sections may be used and one or more of the curved sections may be different to one or more other curved sections.

Figure 3A:
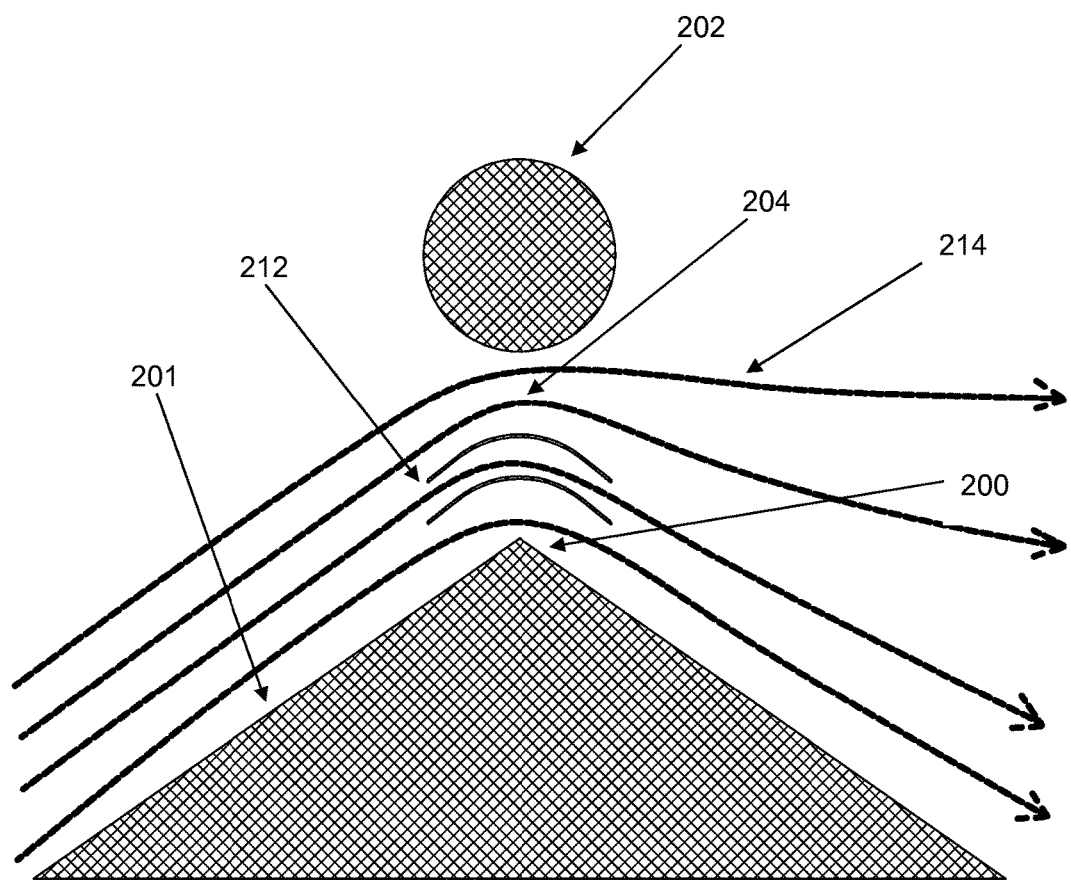
FIG. 3A is the cross sectional view of FIG. 3 with flow streamlines added.

Referring to FIG. 3A, flow streamlines 214 have been added to the arrangement illustrated in FIG. 3. The flow streamlines can be seen expanding downstream of the apex 200, regions of flow separation, turbulence and permanent energy loss are reduced, the example illustrated represents the optimal expansion of airflow streamlines with a discharge coefficient approaching unity. Other flow expansion regimes as illustrated in FIGS. 2B & 2C may be applied to this arrangement if suboptimal conditions which may include excessive flow diversion angle away from the local free stream direction or reduced Flow Optimiser effectiveness are present.

Referring to FIG. 4, a Flow Optimiser 213 according to the first embodiment of the invention, is positioned above the apex 200 of the roof 201 in the gap 204 between the apex 200 and the turbine 202. In this arrangement the Flow Optimiser 213 consists of two curved sections, one positioned above the other, both surfaces are the same shape and size and function to divert a larger portion of airflow more accurately than would be possible with a single surface Flow Optimiser 203 as illustrated in FIG. 2A,B,C. One surface is rotated relative to the other in order to vary the angle at which the surface meets with the airflow and to optimise the airflow diversion angle and the pressure distribution around the curved sections. It is envisaged that one or more of the sections may be translated up or down, upstream or downstream relative to one another and that the rotation of one or more of the curved sections may be about a fixed or variable point of rotation. The greater portion of airflow through the Flow Optimiser and the varying flow diversion angle between adjacent Flow Optimiser surfaces further reduces permanent energy loss associated with the sub-optimal static pressure recovery downstream of the apex 200 of the roof 201 and thus increases the discharge coefficient of the system. In other embodiments more than two curved sections may be used and one or more of the curved sections may be different to one or more other curved sections.

Figure 4A:
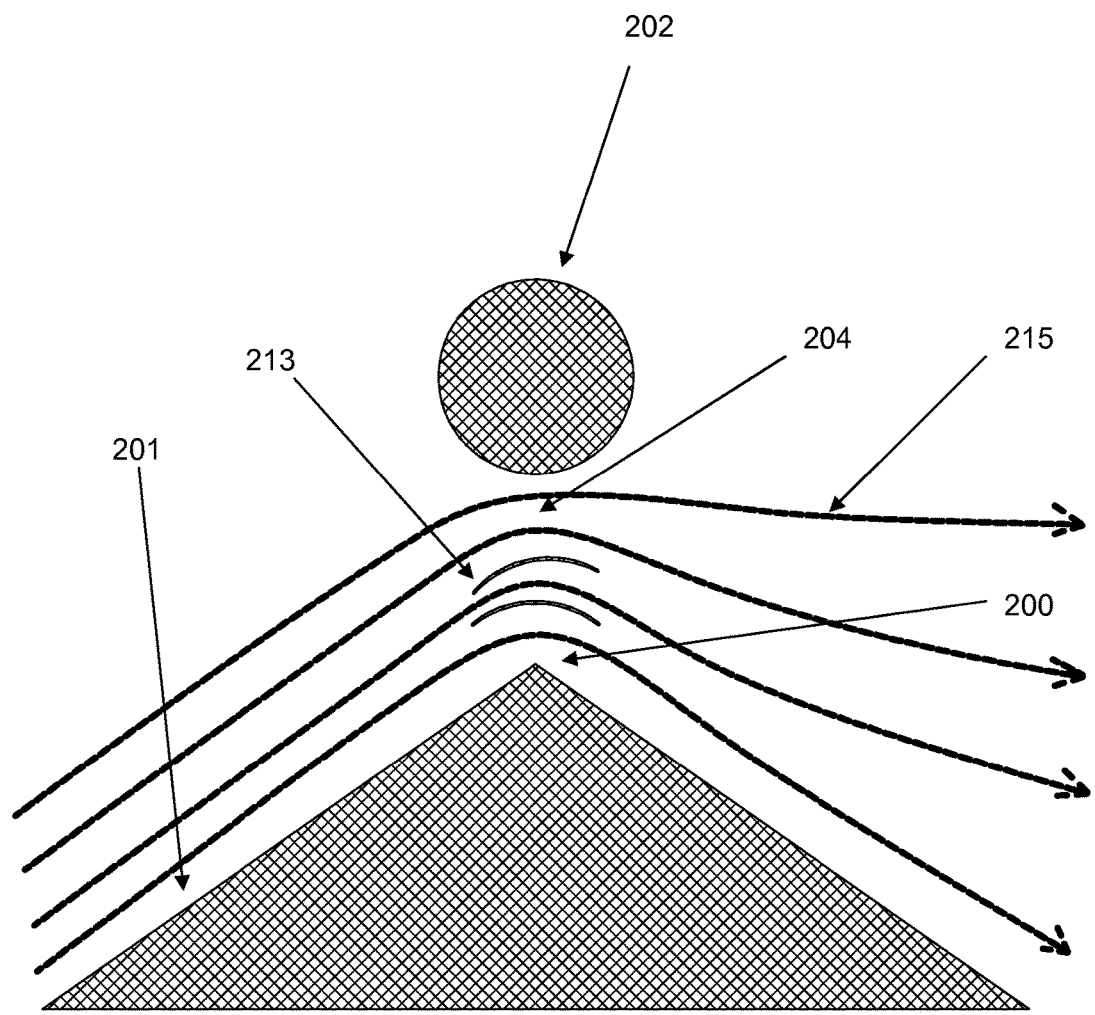
FIG. 4A is the cross sectional view of FIG. 4 with flow streamlines added.

Referring to FIG. 4A, flow streamlines 215 have been added to the arrangement illustrated in FIG. 4. The flow streamlines can be seen expanding downstream of the apex 200, regions of flow separation, turbulence and permanent energy loss are reduced, the example illustrated represents the optimal expansion of airflow streamlines with a discharge coefficient approaching unity. Other flow expansion regimes as illustrated in FIGS. 2B & 2C may be applied to this arrangement if suboptimal conditions which may include excessive flow diversion angle away from the local free stream direction or reduced Flow Optimiser effectiveness are present.

Figure 5:
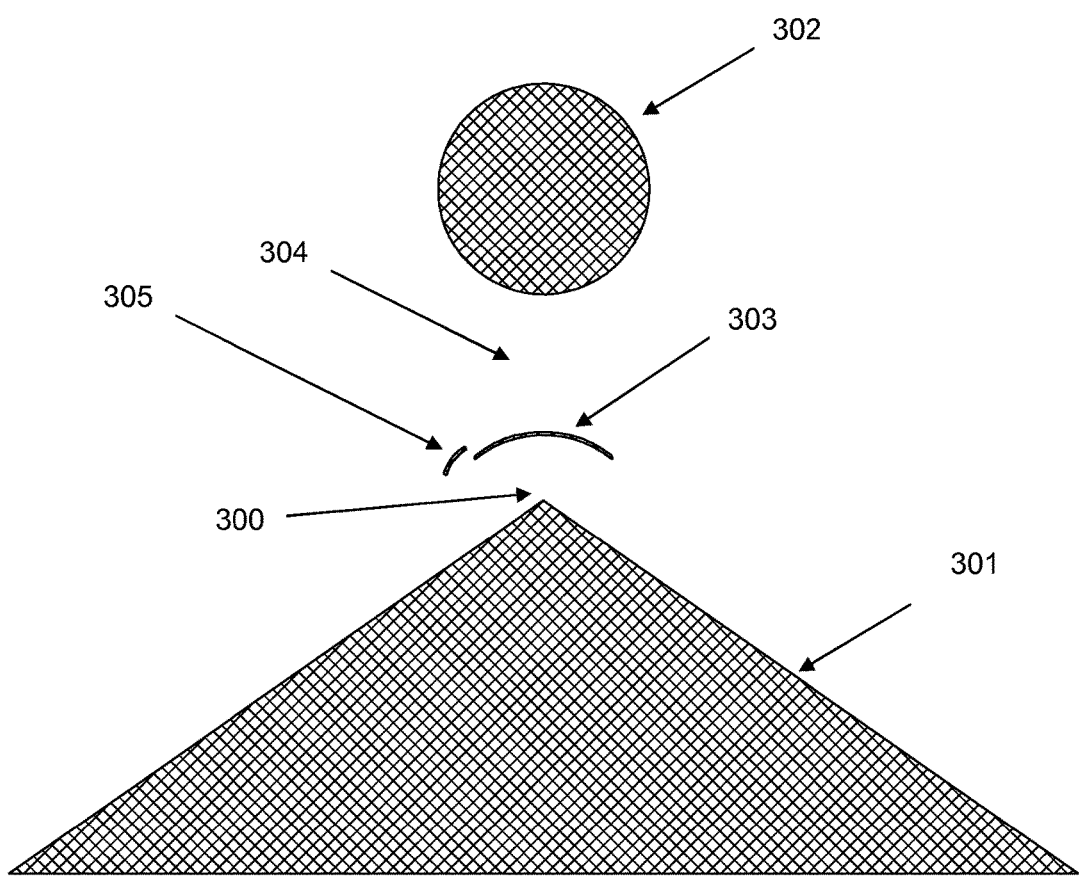
FIG. 5 is a cross sectional view according to a second embodiment of the invention comprising a pitched roof and a transverse flow turbine located above the apex of the roof, a Flow Optimiser is located in the gap between the apex of the roof and the turbine, the Flow Optimiser comprises two curved sections, one preconditioning the airflow upstream of the other.

Referring to FIG. 5, a Flow Optimiser 303 and 305 according to a second embodiment of the invention, is positioned above the apex 300 of the roof 301 in the gap 304 between the apex 300 and the turbine 302. The Flow Optimiser 303 and 305 comprises two or more curved surfaces with one or more of the surfaces 305 preconditioning the airflow upstream of one or more of the other surfaces 303. Flow preconditioning may take the form of controlling the angle of the airflow, the velocity of the airflow or both the angle and velocity of the airflow. The Flow Optimiser with one surface 305 preconditioning flow upstream of another section 303 allows the downstream surface 303 to more effectively and accurately divert airflow away from the local flow direction and into the region downstream of the apex than would be possible with a single surface Flow Optimiser 203 as illustrated in FIG. 2A,B,C. The more effective and accurate airflow diversion further reduces permanent energy loss associated with the sub-optimal static pressure recovery downstream of the apex 300 of the roof 301 and thus increases the discharge coefficient of the system. In other arrangements the one or more of the upstream curved surfaces 305 may be used to regenerate airflow over a downstream low pressure surface on one or more of the other curved surfaces 303.

Figure 5A:
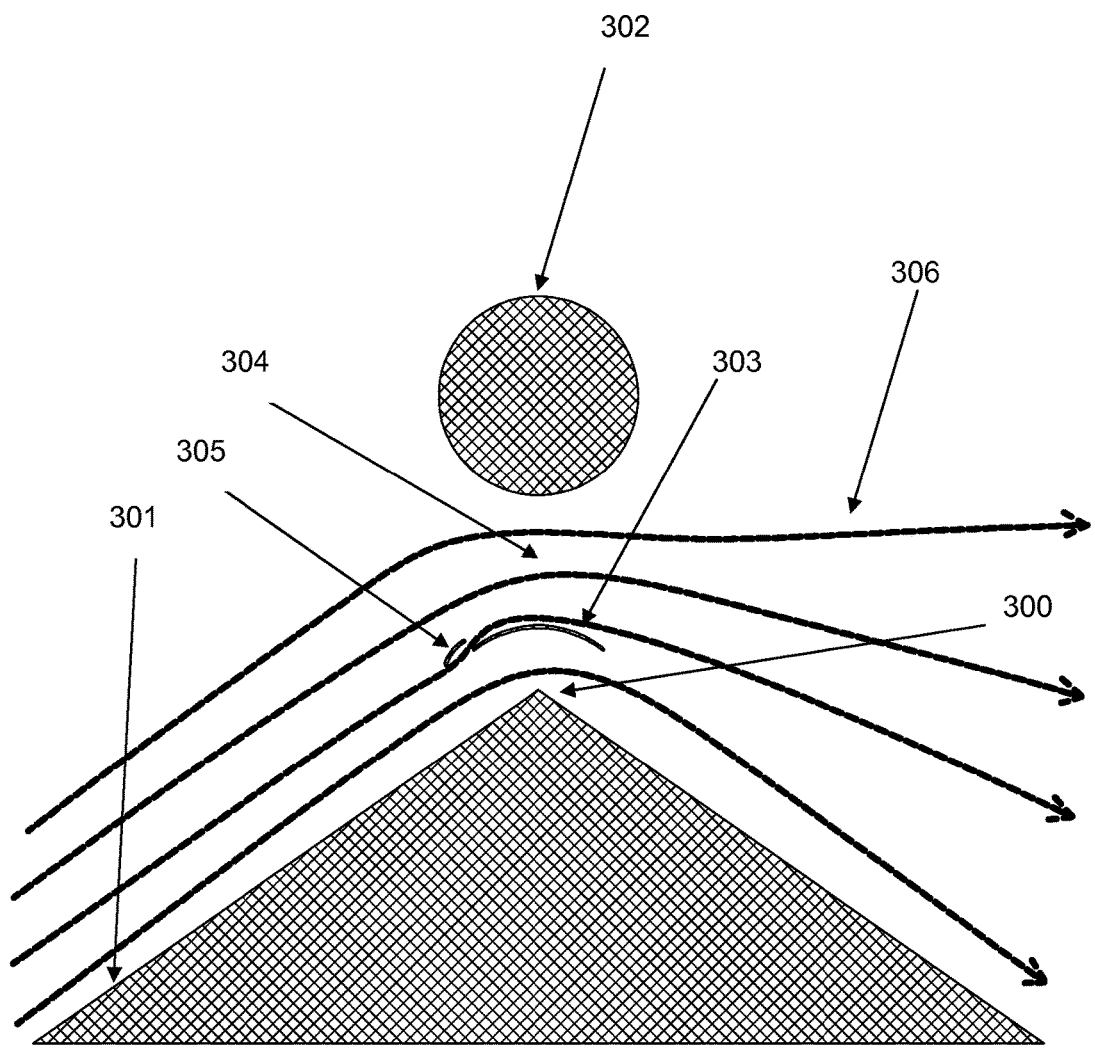
FIG. 5A is the cross sectional view of FIG. 5 with flow streamlines added.

Referring to FIG. 5A, flow streamlines 306 have been added to the arrangement illustrated in FIG. 5. In this flow regime the Flow Optimiser upstream surface 305 is arranged so that the downwash from surface 305 is directed over surface 303 regenerating airflow over the low pressure upper face of surface 303, the result being an improved Flow Optimiser effectiveness. The flow streamlines can be seen expanding downstream of the apex 300, regions of flow separation, turbulence and permanent energy loss are reduced, the example illustrated represents the optimal expansion of airflow streamlines with a discharge coefficient approaching unity. Other flow expansion regimes as illustrated in FIGS. 2B & 2C may be applied to this arrangement if suboptimal conditions which may include excessive flow diversion angle away from the local free stream direction or reduced Flow Optimiser effectiveness are present.

Figure 6:
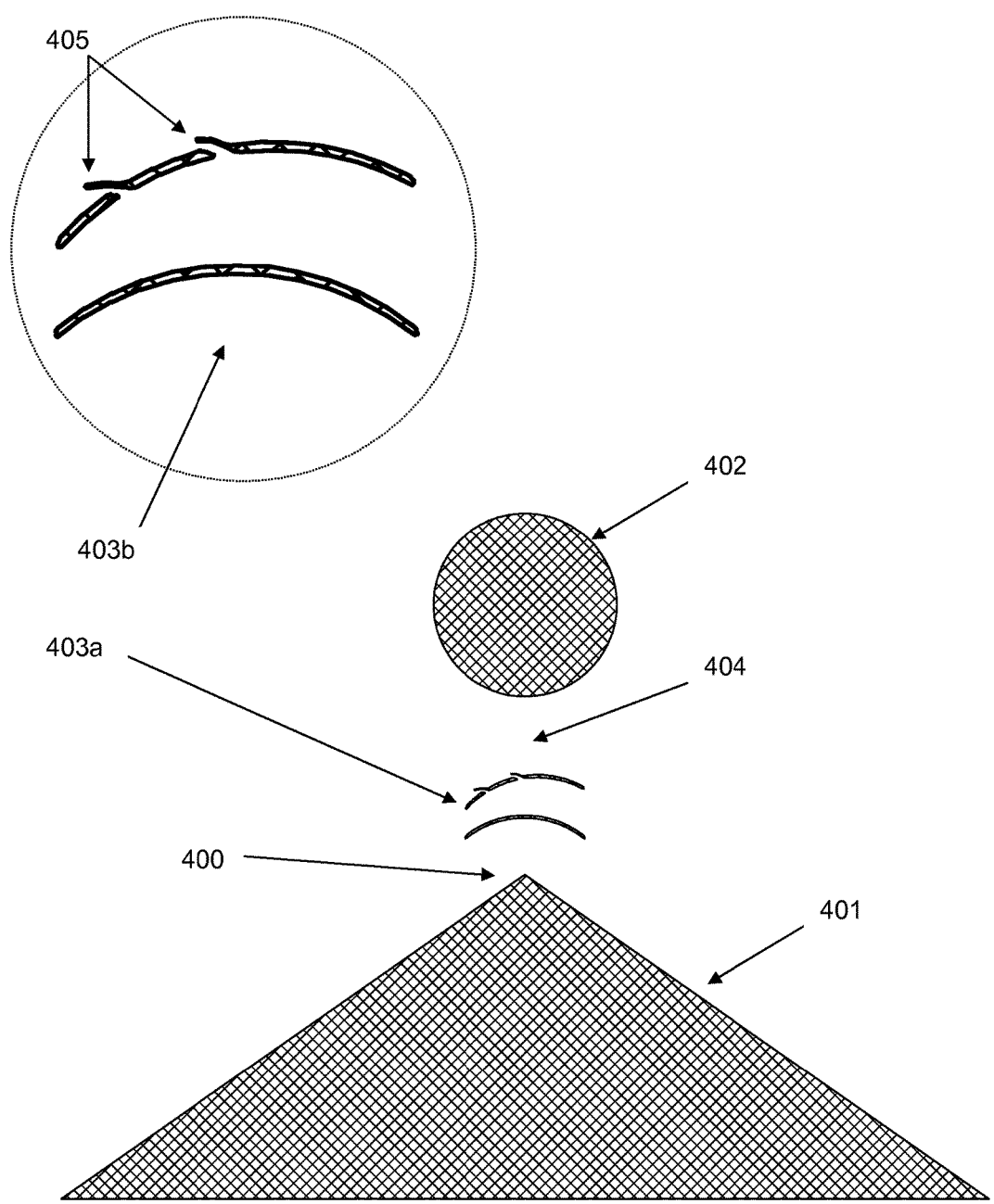
FIG. 6 is a cross sectional view according to a third embodiment of the invention comprising a pitched roof and a transverse flow turbine located above the apex of the roof, a Flow Optimiser with two curved sections is located in the gap between the apex of the roof and the turbine, one of the curved sections includes slots.

Referring to FIG. 6, a Flow Optimiser referred to by the numeral 403a according to a third embodiment of the invention, is positioned above the apex 400 of the roof 401 in the gap 404 between the apex 400 and the turbine 402. A detailed view of the Flow Optimiser 403a is provided in 403b. Airflow slots 405 are positioned on one or more of the surfaces, the airflow slots in FIG. 6 function to bleed air into the Flow Optimiser 403a, 403b and divert a larger portion of airflow more effectively and accurately away from the local flow direction and into the region downstream of the apex than would be possible with a single surface Flow Optimiser 203 as illustrated in FIG. 2A,B,C. The greater portion of airflow through the Flow Optimiser further reduces permanent energy loss associated with the sub-optimal static pressure recovery downstream of the apex 400 of the roof 401 and thus increases the discharge coefficient of the system. In other arrangements apertures may be used in place of slots 405 and the slots 405 or apertures may function to bleed air from the diverted flow within the Flow Optimiser into the gap 404 above the Flow Optimiser. It is envisaged that one or more slots 405 or apertures may be located on one or more of the curved sections which make up the Flow Optimiser 403a, 403b. Slots 405 or apertures may be arranged to bleed airflow from either side of the surface to suit the particular configuration of Flow Optimiser installed.

Figure 6A:
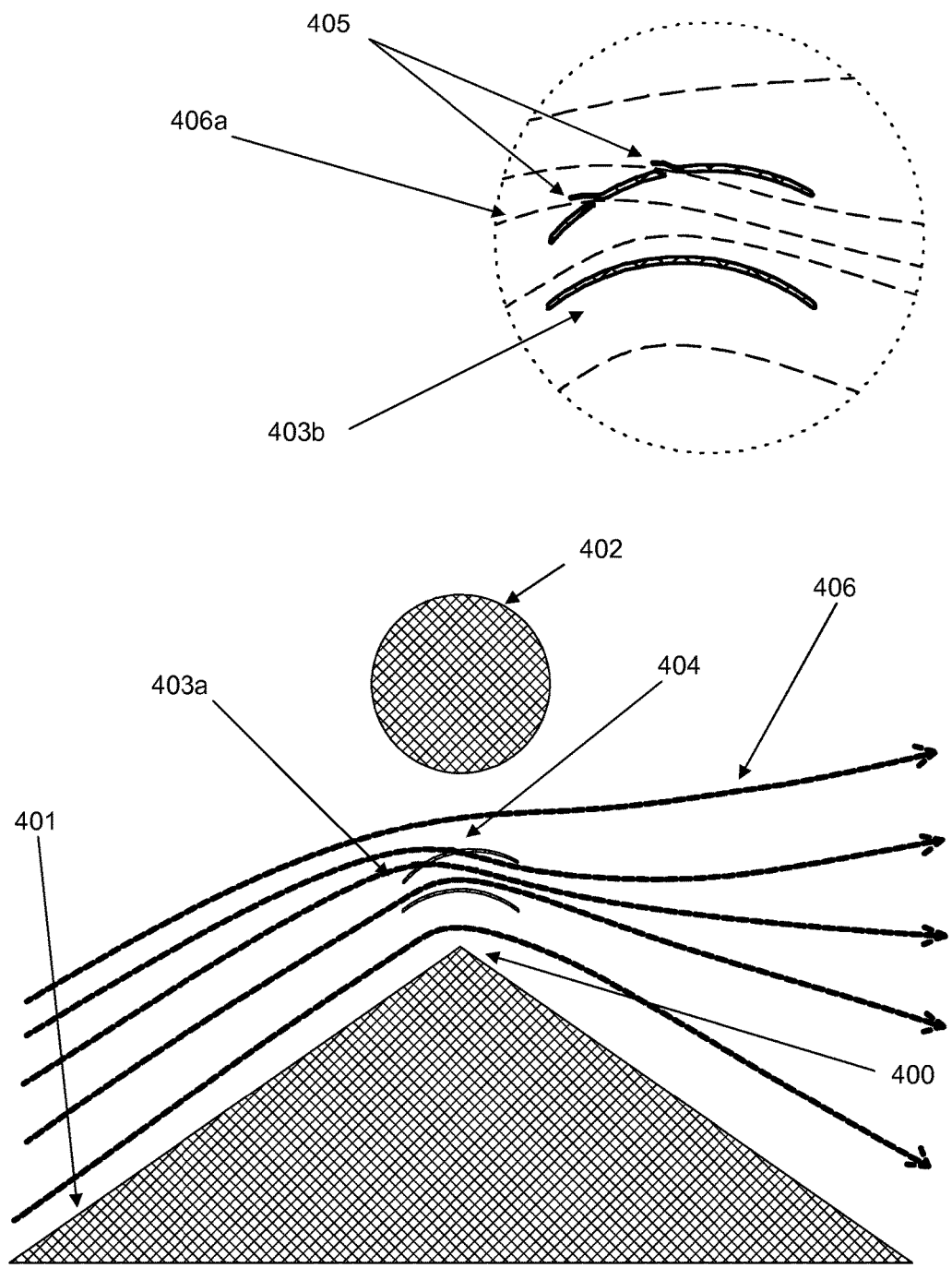
FIG. 6A is the cross sectional view of FIG. 6 with flow streamlines added.

Referring to FIG. 6A, flow streamlines 406, 406a have been added to the arrangement illustrated in FIG. 6. The flow streamlines 406, 406a can be seen bleeding through the slots 405 into the flow optimiser 403a, 403b increasing the mass flow rate through the flow optimiser. The flow streamlines can be seen expanding downstream of the apex 400, regions of flow separation, turbulence and permanent energy loss are reduced, the example illustrated represents the optimal expansion of airflow streamlines with a discharge coefficient approaching unity. Other flow expansion regimes as illustrated in FIGS. 2B & 2C may be applied to this arrangement if suboptimal conditions which may include excessive flow diversion angle away from the local free stream direction or reduced Flow Optimiser effectiveness are present.

Figure 7:
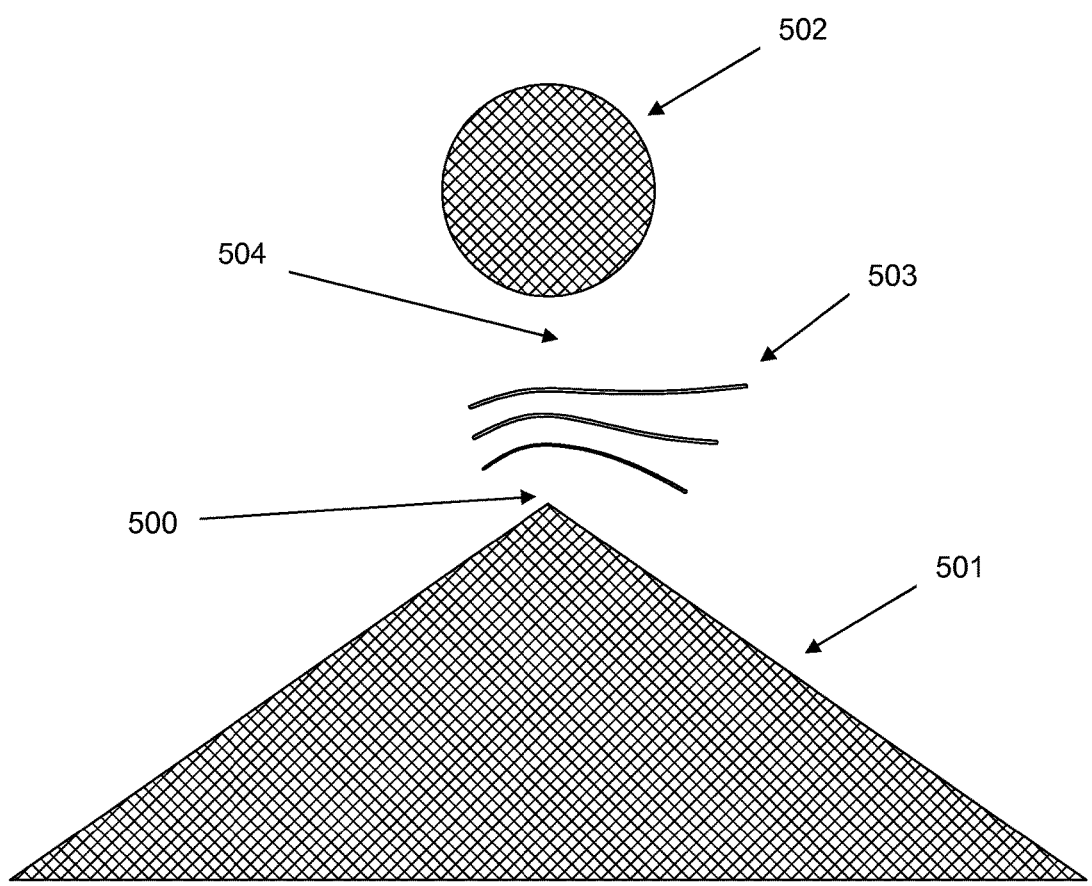
FIG. 7 is a cross sectional view according to a fourth embodiment of the invention comprising a pitched roof and a transverse flow turbine located above the apex of the roof, a Flow Optimiser with three curved sections, each diverting the flow by a different amount, is located in the gap between the apex of the roof and the turbine.

Referring to FIG. 7, a Flow Optimiser 503 according to a fourth embodiment of the invention, is positioned above the apex 500 of the roof 501 in the gap between the apex 500 and the turbine 502. In this embodiment the Flow Optimiser 503 comprises more than one curved section positioned above the apex 500 of the roof 501, each section is spaced apart by a certain distance in the gap 504 and functions to divert a larger portion of airflow more accurately than would be possible with a single surface Flow Optimiser 203 as illustrated in FIG. 2A,B,C. The multiple curved sections allow the diverted airflow to be diffused efficiently into the region downstream of the apex 500 with each portion of diverted flow exiting the Flow Optimiser 503 at the optimum angle. The greater portion of airflow through the Flow Optimiser and the varying flow diversion angle between adjacent Flow Optimiser surfaces further reduces permanent energy loss associated with the sub-optimal static pressure recovery downstream of the apex 500 of the roof 501 and thus increases the discharge coefficient of the system.

Figure 7A:
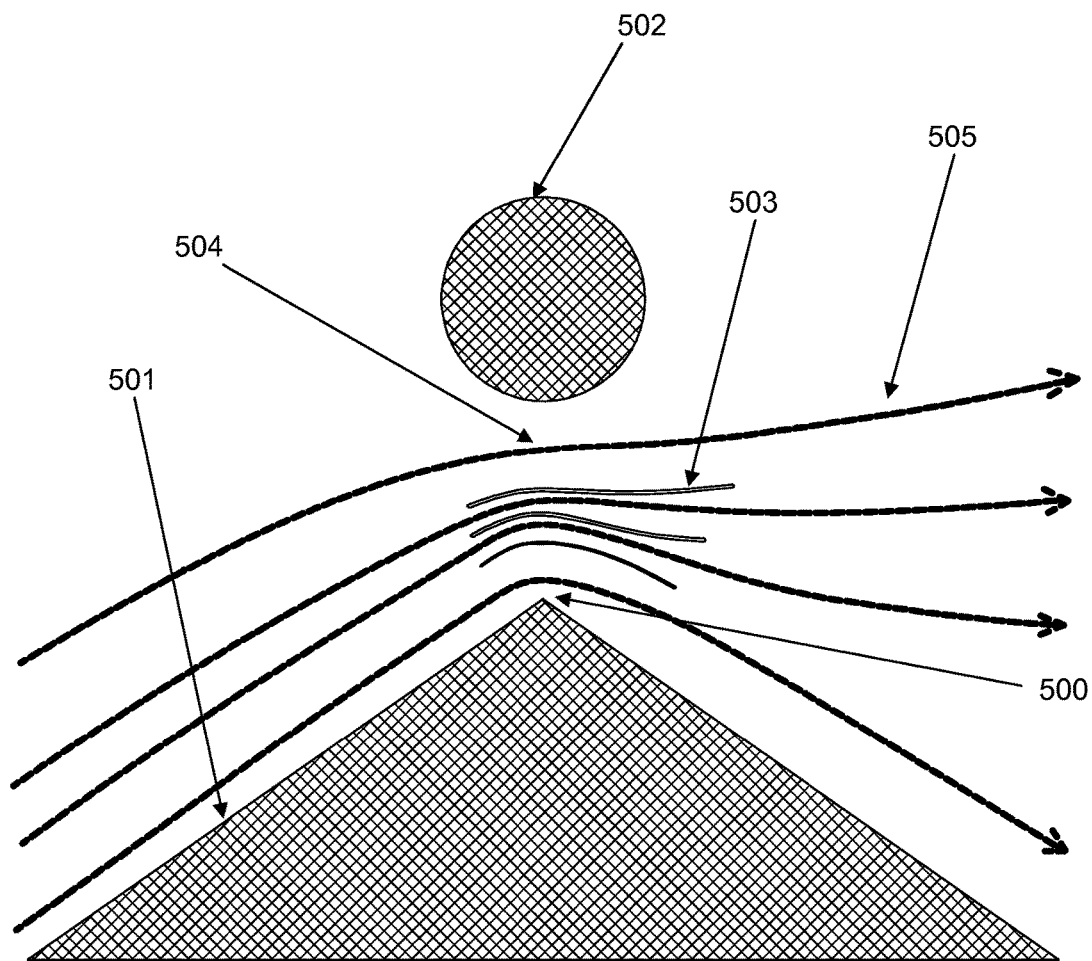
FIG. 7A is the cross sectional view of FIG. 7 with flow streamlines added.

Referring to FIG. 7A, flow streamlines 505 have been added to the arrangement illustrated in FIG. 7. The flow streamlines can be seen exiting the Flow Optimiser at the optimum angle and then expanding downstream of the apex 500, regions of flow separation, turbulence and permanent energy loss are reduced, the example illustrated represents the optimal expansion of airflow streamlines with a discharge coefficient approaching unity. Other flow expansion regimes as illustrated in FIGS. 2B & 2C may be applied to this arrangement if suboptimal conditions which may include excessive flow diversion angle away from the local free stream direction or reduced Flow Optimiser effectiveness are present.

Figure 8:
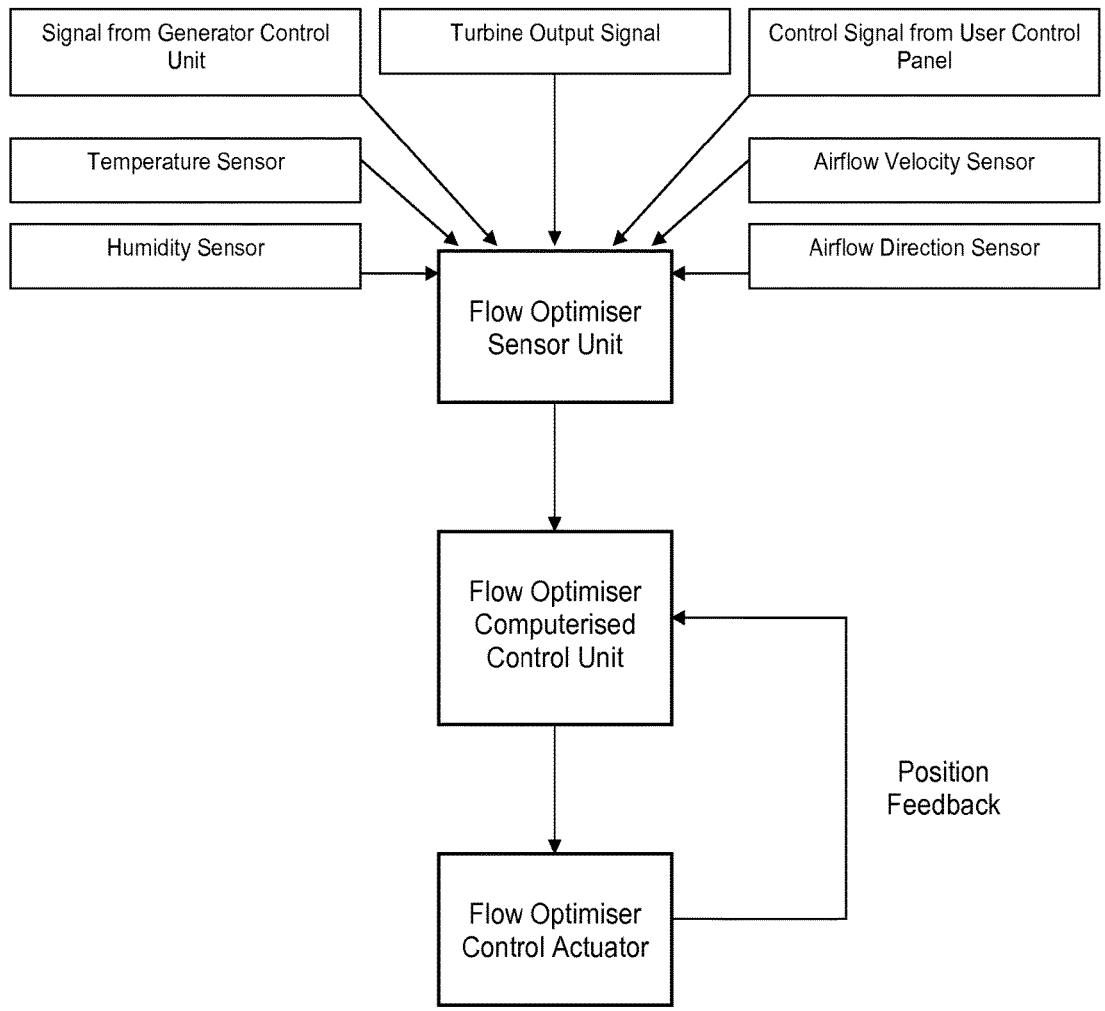
FIG. 8 is a schematic arrangement of a control system according to a fifth embodiment of the invention, used to control the flow optimiser according to the invention.

Referring to FIG. 8, is a method of controlling a Flow Optimiser 203, 212, 213, 303, 305, 403a, 403b, 503. The method comprising inputs into a Flow Optimiser Sensor Unit which is connected to a Flow Optimiser Computerised Control Unit which is in turn operably linked to one or more Flow Optimiser Control Actuators. A position feedback loop is provided for accurate control of the Flow Optimiser.

The invention claimed is:

1. A Flow Optimiser, comprising one or more separate curved sections wherein the one or more curved sections are configured to be positioned in a gap between an apex of a roof and a wind turbine, and wherein the Flow Optimiser is arranged to be positioned substantially parallel to the apex of the roof such that, in use, the flow optimiser is positioned in an airflow, and the one or more curved sections are shaped so as to divert airflow accelerated by the apex of the roof into the direction of the roof surface downstream of the apex to increase the mass flow rate in the gap between the apex and the wind turbine, and wherein the Flow Optimiser is arranged to be collocated with the wind turbine positioned substantially above the Flow Optimiser.

2. A Flow Optimiser according to claim 1 comprising a plurality of said curved sections, wherein the plurality of said curved sections are spaced apart overlaying each other in the gap between the apex and the turbine, and the curved sections align substantially perpendicular to the direction of airflow, each section having the same profile and length as the one or more other curved sections.

3. A Flow Optimiser according to claim 1 comprising a plurality of said curved sections, wherein the plurality of said curved sections are spaced apart overlaying each other in the gap between the apex and the turbine, and the curved sections align substantially perpendicular to the direction of airflow, each section having a different profile and different length to the one or more other curved sections.

4. A Flow Optimiser according to claim 1 comprising a plurality of said curved sections, wherein one or more of the curved sections has an orientation which is rotated relative to one or more other of the curved sections about an axis substantially parallel to the apex of the roof.

5. A Flow Optimiser according to claim 1 comprising a plurality of said curved sections, with one or more of the curved sections located substantially upstream of one or more other of the curved sections.

6. Flow Optimiser according to claim 1 wherein one or more of the curved sections includes any combination of slots, apertures or secondary inlets or outlets which function to vary the airflow rate on either side of the curved section as the airflow moves along a chord line of the section.

7. A method of controlling the position and angle of a Flow Optimiser comprising one or more separate curved sections, wherein the one or more curved sections are configured to be positioned in a gap between an apex of a roof and a wind turbine, and wherein the Flow Optimiser is arranged to be positioned substantially parallel to the apex of the roof such that, in use, the flow optimiser is positioned in an airflow, and the one or more curved sections are shaped so as to divert airflow accelerated by the apex of the roof into the direction of the roof surface downstream of the apex to increase the mass flow rate in the gap between the apex and the wind turbine, and wherein the Flow Optimiser is arranged to be collocated with the wind turbine positioned substantially above the Flow Optimiser, the method comprising the steps of:
adjusting the position and angle of one or more of the curved sections of the Flow Optimiser;
determining the electrical output of the collocated wind turbine; and repeating the above steps in order to achieve required electrical power output from an electrical generator.

8. A method of controlling a Flow Optimiser, according to claim 7, wherein actuation of the one or more curved sections is achieved aerodynamically.

9. A method of controlling a Flow Optimiser, according to claim 7, wherein actuation of one or more curved sections is linked to operation of the turbine or turbine accessories with which the Flow Optimiser is collocated.

10. A method of controlling a Flow Optimiser, according to claim 7, wherein actuations of the one or more curved sections is in response to outputs from a control algorithm such as found in a computerised control system.

11. A method of controlling a Flow Optimiser, according to claim 7, comprising controlling the one or more curved sections to direct airflow from either side of the roof.

12. A method of controlling a Flow Optimiser according to claim 7, comprising controlling the one or more curved sections to optimise acceleration of the airflow within the gap above the Flow Optimiser.

13. A method of controlling a Flow Optimiser according to claim 7, comprising controlling the one or more curved sections to optimise the diffusion or expansion of the airflow downstream of the apex, in order to reduce the energy loss in the system.

14. A method of controlling a Flow Optimiser comprising one or more separate curved sections, wherein the one or more curved sections are configured to be positioned in a gap between an apex of a roof and a wind turbine, and wherein the Flow Optimiser is arranged to be positioned substantially parallel to the apex of the roof such that, in use, the flow optimiser is positioned in an airflow, and the one or more curved sections are shaped so as to divert airflow accelerated by the apex of the roof into the direction of the roof surface downstream of the apex to increase the mass flow rate in the gap between the apex and the wind turbine, and wherein the Flow Optimiser is arranged to be collocated with the wind turbine positioned substantially above the Flow Optimiser, the method comprising the steps of:
  receiving an input from one or more of a plurality of sensors;
  comparing the received input to a predetermined value; and
  using the results from the comparison step to determine the required adjustment to the position and angle of each curved section of the Flow Optimiser.

15. A method of controlling a Flow Optimiser in accordance with claim 14, wherein the plurality of sensors are arranged to detect one or more variables selected from the group consisting of: airflow speed; airflow direction; temperature; humidity; vibration; and pressure.

16. A method of controlling a Flow Optimiser, according to claim 14, wherein actuation of the one or more curved sections is achieved aerodynamically.

17. A method of controlling a Flow Optimiser, according to claim 14, wherein actuation of one or more curved sections is linked to operation of the turbine or turbine accessories with which the Flow Optimiser is collocated.

18. A method of controlling a Flow Optimiser, according to claim 14, wherein actuations of the one or more curved sections is in response to outputs from a control algorithm such as found in a computerised control system.

* * * * *